US012612971B2

(12) United States Patent
Bernard et al.

(10) Patent No.: US 12,612,971 B2
(45) Date of Patent: Apr. 28, 2026

(54) BIDIRECTIONAL ONE PIECE METAL SEAT FOR BALL VALVE

(71) Applicant: Bray International, Inc., Houston, TX (US)

(72) Inventors: Justin Bernard, Houston, TX (US); Mitchell Anderson, Katy, TX (US); Joshua Andrews, Brookshire, TX (US); Kishorekumar Vijayaram, Cypress, TX (US)

(73) Assignee: Bray International, Inc., Houston, TX (US)

( * ) Notice: Subject to any disclaimer, the term of this patent is extended or adjusted under 35 U.S.C. 154(b) by 25 days.

(21) Appl. No.: 18/583,083

(22) Filed: Feb. 21, 2024

(65) Prior Publication Data

US 2024/0280178 A1     Aug. 22, 2024

Related U.S. Application Data

(60) Provisional application No. 63/486,301, filed on Feb. 22, 2023.

(51) Int. Cl.
*F16K 5/06* (2006.01)
*F16K 5/20* (2006.01)

(52) U.S. Cl.
CPC ............ *F16K 5/0689* (2013.01); *F16K 5/205* (2013.01)

(58) Field of Classification Search
CPC ........ F16K 5/205; F16K 5/207; F16K 5/0673; F16K 5/0678; F16K 5/0668; F16K 5/0689
See application file for complete search history.

(56) References Cited

U.S. PATENT DOCUMENTS

| | | | | |
|---|---|---|---|---|
| 2,191,232 A | * | 2/1940 | Heinen ................... | F16K 5/207 |
| | | | | 277/369 |
| 2,777,664 A | * | 1/1957 | Bryant .................. | F16K 3/0236 |
| | | | | 251/174 |
| 3,204,924 A | * | 9/1965 | Bredtschneider ..... | F16K 3/0236 |
| | | | | 251/328 |
| 4,215,722 A | | 8/1980 | Sigmon | |
| 4,502,663 A | | 3/1985 | Huber | |
| 4,899,980 A | | 2/1990 | Kemp | |
| 6,161,569 A | | 12/2000 | Gonsior | |

(Continued)

FOREIGN PATENT DOCUMENTS

| | | | | |
|---|---|---|---|---|
| CN | 106168298 A | * | 11/2016 | |
| DE | 202006010374 U1 | * | 12/2007 | ........... F16K 5/0673 |

(Continued)

OTHER PUBLICATIONS

Machine English translation of CN-106168298-A (Year: 2025).*

(Continued)

*Primary Examiner* — Hailey K. Do

(74) *Attorney, Agent, or Firm* — Oathout Law Firm; Laura Tu; Mark A. Oathout

(57)     ABSTRACT

The disclosure relates a metal seat for a ball valve, having a seating segment of the metal seat; a curved seating surface defined on the seating segment, wherein the curved seating surface is complementary to an outer surface of a ball of the ball valve; a primary spring unitary with the seating segment and the curved seating surface; and a base unitary with the primary spring, the seating segment, and the curved seating surface.

22 Claims, 9 Drawing Sheets

(56)                References Cited

U.S. PATENT DOCUMENTS

| | | | |
|---|---|---|---|
| 8,424,841 B2 | 4/2013 | Frenzel | |
| 8,702,056 B2 | 4/2014 | Crochet et al. | |
| 8,887,755 B2 | 11/2014 | Nguyen et al. | |
| 9,079,145 B2 * | 7/2015 | Baranowski | B01J 8/003 |
| 10,228,065 B2 | 3/2019 | Gaburri et al. | |
| 11,149,869 B2 | 10/2021 | England et al. | |
| 2002/0185625 A1 | 12/2002 | Gosling | |
| 2011/0024662 A1 * | 2/2011 | Seveso | F16K 5/0673 |
| | | | 251/315.08 |
| 2012/0217425 A1 * | 8/2012 | Beasley | F16K 5/0678 |
| | | | 29/890.12 |
| 2021/0190217 A1 | 6/2021 | Bergström et al. | |

FOREIGN PATENT DOCUMENTS

| | | | |
|---|---|---|---|
| EP | 1043526 A2 | 10/2000 | |
| IT | PR20100016 A1 * | 9/2011 | |
| WO | 2011066442 A2 | 6/2011 | |
| WO | 2015173424 A1 | 11/2015 | |

OTHER PUBLICATIONS

Machine English translation of DE-202006010374-U1 (Year: 2025).*
Machine English translation of ITPR20100016 (Year: 2025).*
Muller, Bernhard, PCT International Search Report for PCT/US2024/016644, May 31, 2024, 5 pages, European Patent Office, Rijswijk, Netherlands.
Muller, Bernhard, Written Opinion of the International Search Authority for PCT/US2024/016644, May 31, 2024, 12 pages, European Patent Office, Munich, Germany.

* cited by examiner

BIDIRECTIONAL ONE PIECE METAL SEAT FOR BALL VALVE

BACKGROUND

Technical Field: The disclosure relates to metal seated ball valves. Metal seated ball valves are used in a wide variety of industries, including oil & gas, petroleum, petrochemical, chemical, power generation, pulp & paper, and mining among many others. Metal seated ball valves are generally utilized when a seal is required in services with high operating temperatures and/or corrosive or abrasive media.

Conventional embodiments for metal seats for ball valves include the F15/F30 MS and the R100 and R200 M1 Severe Service Ball Valve, both which are commercially available from Bray International, Inc. The F15/F30 MS is a unidirectional modular design that places a spring and seat on the upstream side and a gasket and seat on the downstream side of the valve. The back face of the downstream seat is serrated to dig into a graphite gasket behind the seat to prevent leakage behind the seat. The compressive load between the ball and the upstream seat is driven by a spring placed behind the seat, which may be a wave spring. The R100 and R200 M1 Severe Service Ball Valves include a spring and a seat on the upstream side, and with a seat and a locking plate on the downstream side. Behind the seats on the downstream side of the R100 and R200 M1 Severe Service Ball Valves is a raised lip with a designated contact area to predictably seal behind the seat. The back face of the downstream seat is lapped to mate with the raised lip with a designed contact area to optimize contact stress to seal behind the seat. Like the F15/F30 MS, the compressive load between the ball and the upstream seat in the R100 and R200 M1 Severe Service Ball Valves is driven by a spring placed behind the seat, although this spring may be a wave spring or a Belleville spring. The conventional embodiments exemplified by F15/F30 MS and R100 and R200 M1 Severe Service Ball Valve demonstrates the limitation of use cases for these valves, as they are designed to seal in one direction only. Other conventional models may utilize a spring behind both seats and an additional elastomer to assist with the peripheral seal on the downstream seat, allowing bidirectional use. While this makes the design bidirectional, it limits the temperature range making it not suitable for high-temperature applications, such as temperatures over 450 degrees Fahrenheit.

Conventional standard floating ball valve seats also normally present at least two common leak paths: between the seat and the ball, and behind the seat. In soft-seated floating ball valves, these leak paths are addressed either with designed compressive stress or with o-rings. In metal-seated floating ball valves, the compressive stress between the seat and the ball is generated with a spring and a designated contact area; the leakage behind the seat is generally prevented with a graphite gasket or with a mate-lapped back surface (also with a designated contact area for predictable stress). To simplify design and increase predictability, metal seated floating ball valves can be designed to be one-directional with a spring loading the stress behind the designated upstream seat, while the downstream seat has a gasket and/or lapped back face behind the downstream seat.

Therefore, a need exists for an improved metal seat for a ball valve which: allows for bidirectional use; eliminates or minimizes the leak paths seen in conventional models; prevents debris and particulates from interfering with the metal seat and the spring(s); allows custom spring design; is able to more closely control contact stress; and is able to better control the torque in the ball valve.

SUMMARY

The disclosure relates a metal seat for a ball valve, having a seating segment of the metal seat; a curved seating surface defined on the seating segment, wherein the curved seating surface is complementary to an outer surface of a ball of the ball valve; a primary spring unitary with the seating segment and the curved seating surface; and a base unitary with the primary spring, the seating segment, and the curved seating surface.

BRIEF DESCRIPTION OF THE DRAWINGS

The exemplary embodiments may be better understood, and numerous objects, features, and advantages made apparent to those skilled in the art by referencing the accompanying drawings. These drawings are used to illustrate only exemplary embodiments, and are not to be considered limiting of its scope, for the disclosure may admit to other equally effective exemplary embodiments. The figures are not necessarily to scale and certain features and certain views of the figures may be shown exaggerated in scale or in schematic in the interest of clarity and conciseness.

DESCRIPTION OF EMBODIMENT(S)

The description that follows includes exemplary apparatus, methods, techniques, and instruction sequences that embody techniques of the inventive subject matter. However, it is understood that the described embodiments may be practiced without these specific details.

Figure 1:
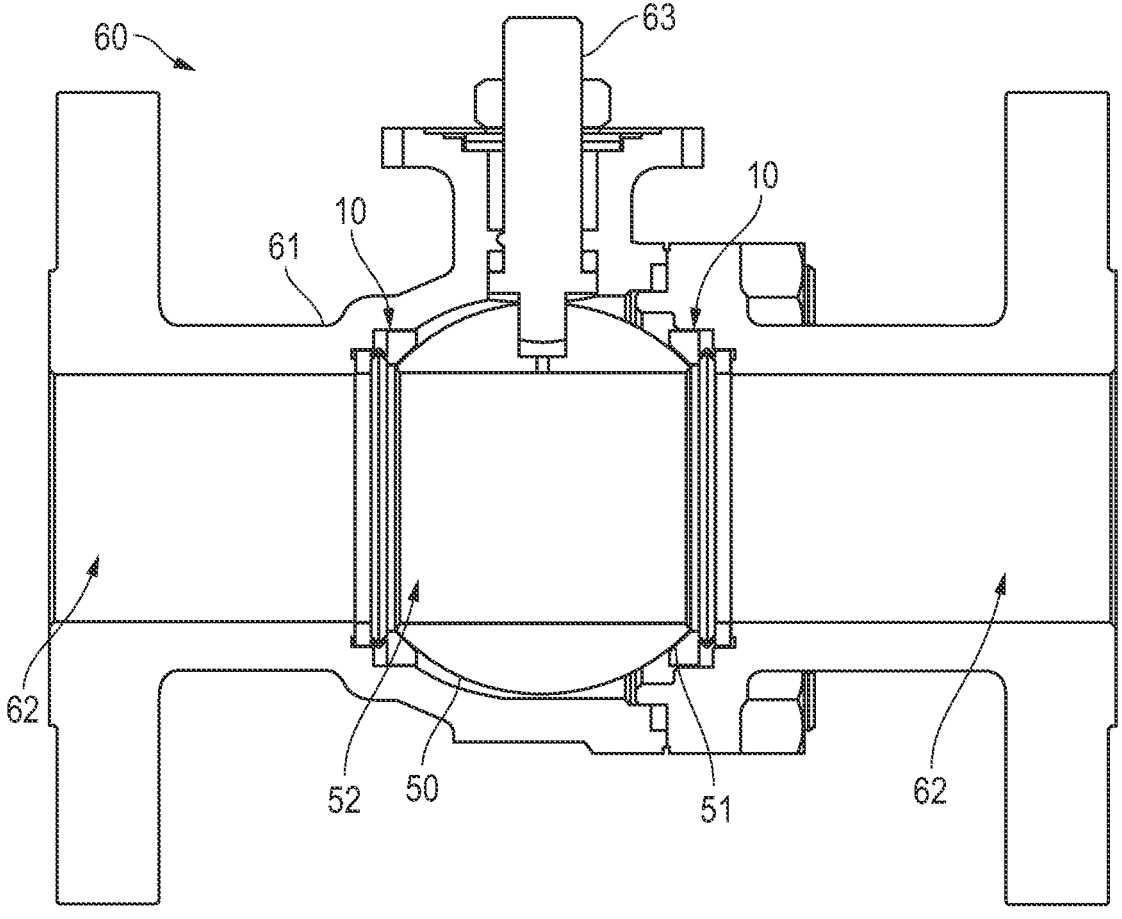
FIG. 1 depicts a cross sectional view of an exemplary embodiment of a ball valve with a bidirectional unitary metal seat and a ball.
Figure 2:
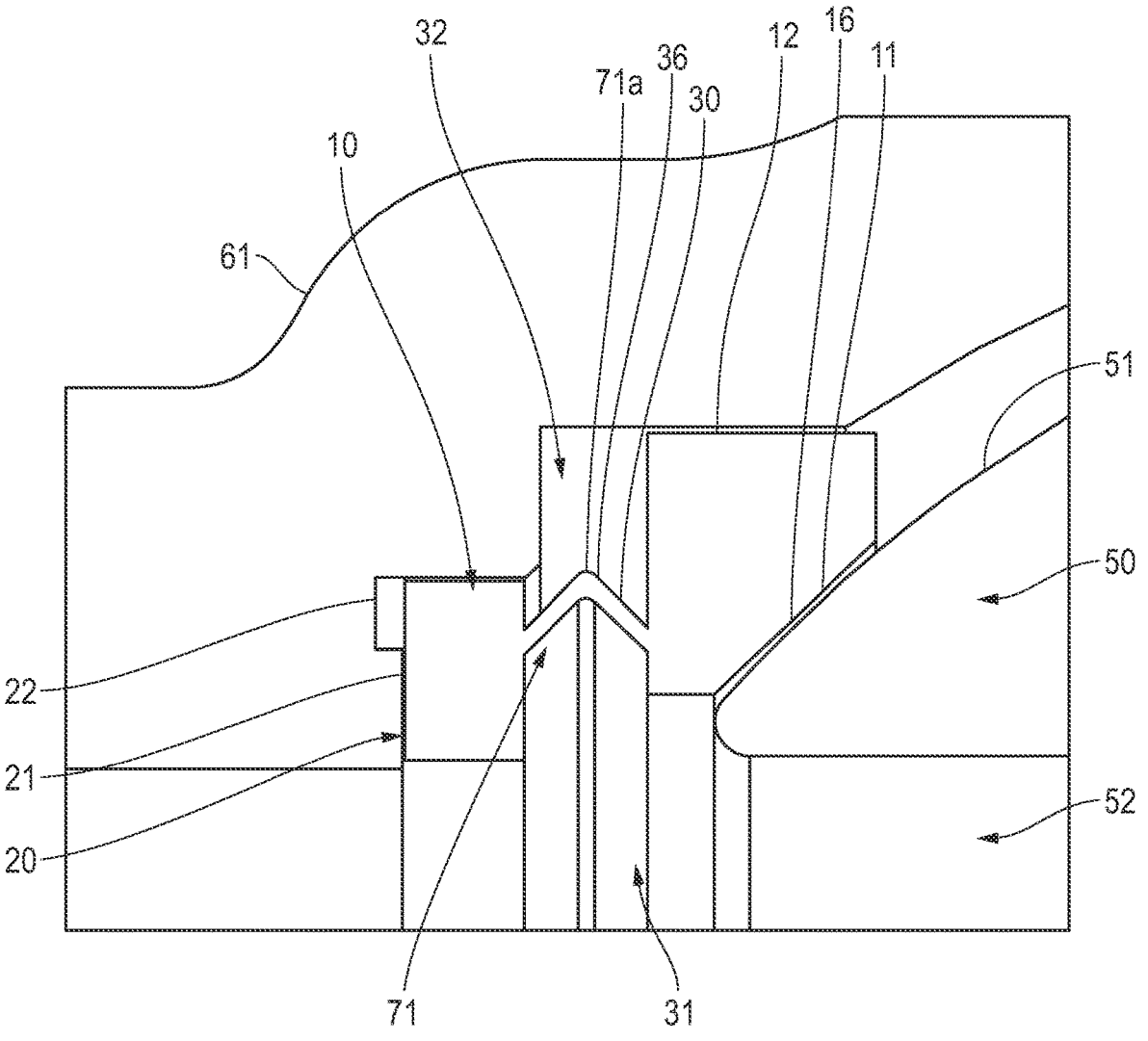
FIG. 2 depicts an enlarged partial cross sectional view of an exemplary embodiment of the metal seat and ball of FIG. 1.

FIG. 1 depicts a cross sectional view of an exemplary embodiment of a ball valve 60 with a bidirectional unitary metal seat 10 in both the upstream and downstream position and a ball 50. FIG. 2 depicts an enlarged partial cross sectional view of an exemplary embodiment of the metal seat 10 and ball 50 of FIG. 1. The ball valve 60 includes a valve body 61 which defines a valve body bore 62 through the longitudinal length of the valve body 61, and in which a valve media can flow therethrough. The flow of the valve media can be controlled by rotating and thus aligning or unaligning an opening 52 of a ball 50 within the bore 62 of the valve body 61. The ball 50 has a substantially spherical outer surface 51 and can be rotated within one or more metal seats 10 via the valve stem 63.

The metal seat 10 is unitary, integral or formed as one/singular piece with a seating segment 12, a spring 30 (or primary spring or primary spring segment 30), and a base 20 and is inserted into the valve body 61. The metal seat 10 may have a substantially toroidal, annular, or ring-shaped appearance or form when viewed in whole at an isometric view (see e.g. FIG. 3A). The seating segment 12 of the metal seat 10 defines a curved surface, seat surface, arced surface, seating surface or seat interface 11 which may be mate-lapped and arced to match or be complementary to the outer surface 51 of the ball 50. The mate-lapping of the seating surface 11 ensures the seal's efficacy between the seating surface 11 and the outer surface 51 and prevents leak paths due to surface imperfections that would otherwise be present in the seating surface 11. The metal seat 10 may be used in both the upstream and downstream positions of the ball 50, as is depicted in FIG. 1, wherein a metal seat 10 is located on both sides of the ball 50 which are adjacent to the bore 62. Alternatively, the metal seat 10 may be used in only one of the upstream or downstream position of the ball 50, as desired. In comparison, conventional metal seated ball valves often must use a first seat arrangement for the upstream side and a different seat arrangement for downstream side of the ball 50 to achieve efficacious sealing and leak prevention.

Figure 3A:
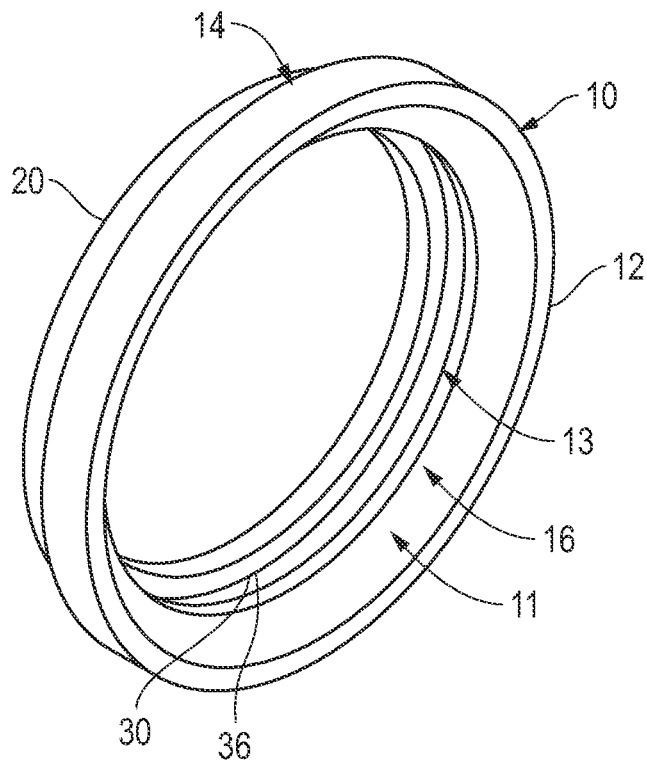
FIG. 3A depicts an isometric view of an exemplary embodiment of a bidirectional unitary metal seat for a ball valve.
Figure 3B:
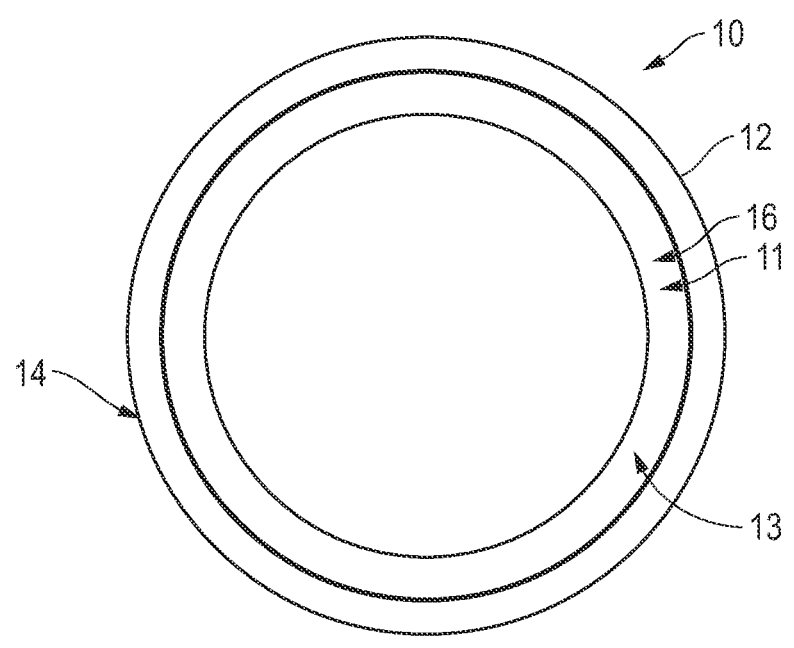
FIG. 3B depicts a front view of an exemplary embodiment of a bidirectional unitary metal seat for a ball valve.

FIG. 3A depicts an isometric view of the bidirectional unitary metal seat 10, which further demonstrates the unitary nature of the seating segment 12, the spring 30, and the base 20 of the metal seat 10, and the annular or ring-shaped form of each of the components (the seating segment 12, the spring 30, and the base 20) which unite to form the metal seat 10. FIG. 3B depicts a front view of the metal seat 10, demonstrating the interior surface 13 and the exterior surface 14 of the metal seat 10. The primary spring 30 of the metal seat 10 connects the seating segment 12 and curved seating surface 11 to the base 20. The primary spring 30 may also be and act as a bellows for the metal seat 10, wherein the bellows 36 is for the purpose of eliminating valve leakage and preventing debris from getting or collecting behind the seat 10 and/or into the valve body 61. The spring 30 may also be pre-loaded or pre-biased during assembly in such a way that the seat surface 11 maintains contact and the desired seal against the ball outer surface 51 when flow is present from either direction. A metallic bellow cartridge may optionally be joined unitary and proximate the seating segment 12. A bellow 36 is a long accordion-like tube. As the valve spring 30 or seat or seating segment 12 moves 10, the bellow 36 expands or compresses with the movement. Thus the bellow 36 functions as a seal through which process fluid cannot pass. A spring alone may be more likely to allow leakage. Accordingly, the spring 30 and the bellows 36 work together in these alternative exemplary embodiments, where the bellows 36 enhances the leak prevention capabilities of the unitary seat 10. The primary spring 30, being unitary with the base 20 and the seating segment 12 with the seating surface 11, eliminates a leak path behind the seat 10. The primary spring 30 also pushes the seat surface 11 against the ball 50 when installed in the valve so as to prevent or minimize the upstream leak path. A conventional seat including a spring would traditionally be made of separate components (i.e. non-unitary), which enable leakage to occur between interface of the components and between the components and the valve body, and through the gaps of the conventional coiled springs themselves.

Figure 4:
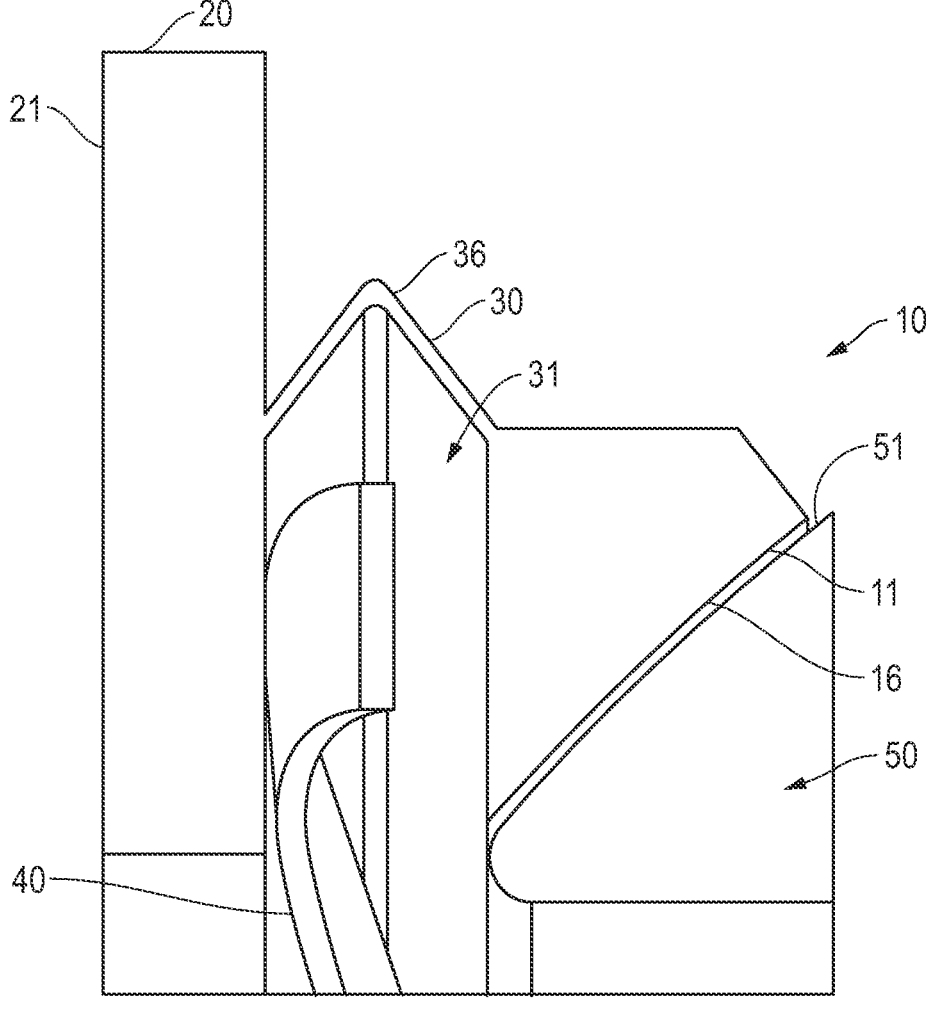
FIG. 4 depicts a partial cross sectional view of an alternative exemplary embodiment of a metal seat and a ball for a ball valve.
Figure 11:
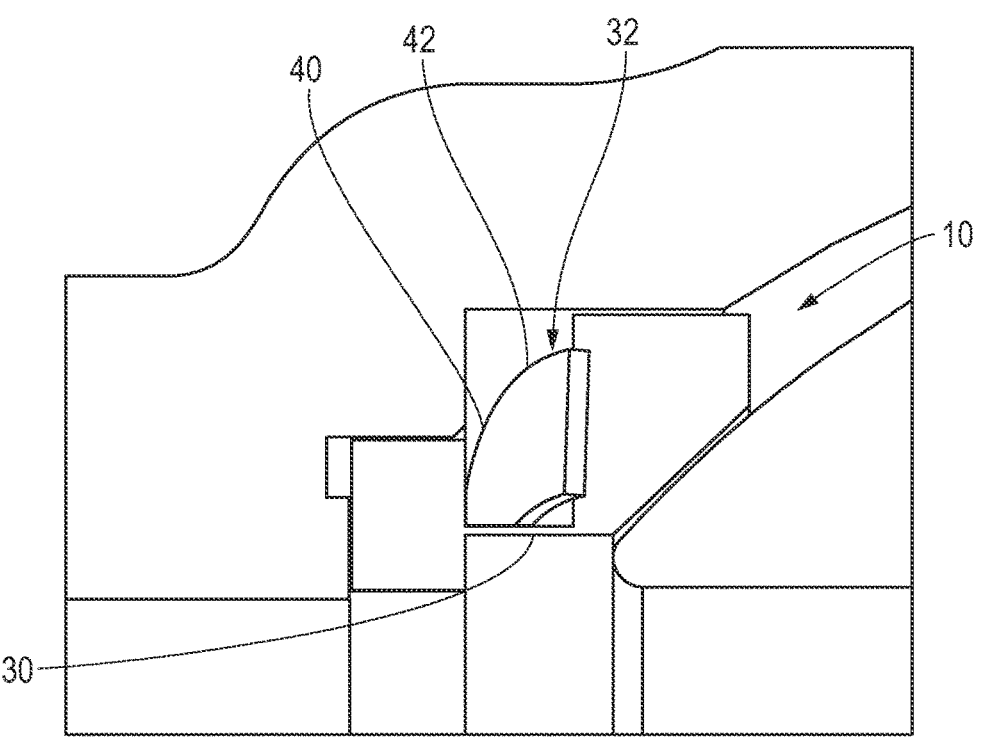
FIG. 11 depicts a partial cross sectional view of an alternative exemplary embodiment of a metal seat having a primary spring and a one-piece wave spring and a ball for a ball valve.
Figure 12:
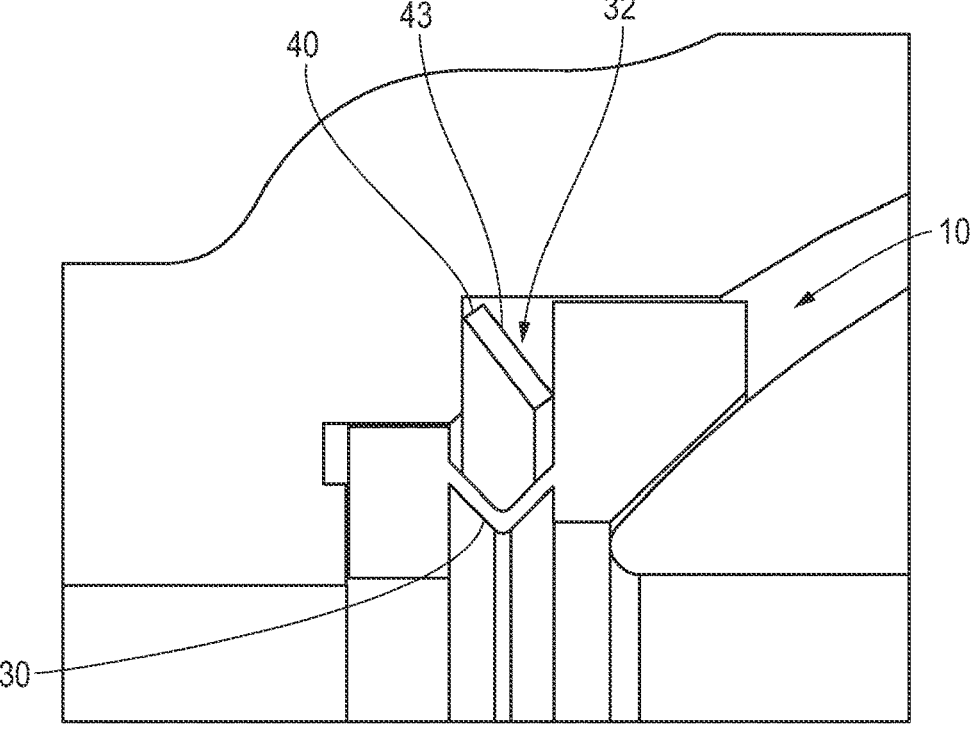
FIG. 12 depicts a partial cross sectional view of an alternative exemplary embodiment of a metal seat having a primary spring and an external Belleville spring and a ball for a ball valve.
Figure 13:
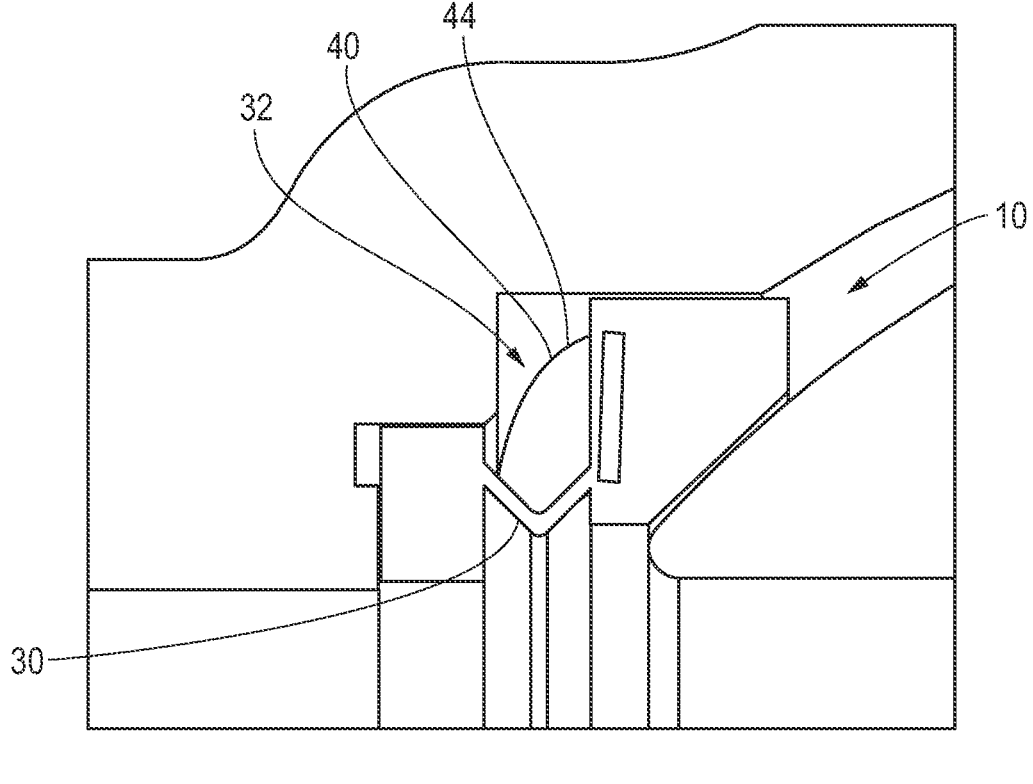
FIG. 13 depicts a partial cross sectional view of an alternative exemplary embodiment of a metal seat having a primary spring and a secondary external wave spring and a ball for a ball valve.

The primary spring 30 defines a bottom or lower interstitial area or interstice 31 between the spring 30, base 20, and seating segment 12 in the interior surface 13 of the metal seat 10, and is open to the bore 62 when installed into the ball valve 60. The primary spring 30 also defines an upper interstitial area or interstice 32 in the exterior surface 14 of the metal seat 10, is bounded by the valve body 61, the seating segment 12 and the spring 30, and is open to the valve body 61 when installed into the ball valve 60. An optional secondary spring 40 may be inserted in the bottom interstices 31 and/or upper interstices 32 which can serve to enhance or increase the sealing capability of the seat surface 11 against the ball 50 (see e.g. FIGS. 4 and 11-13). The secondary spring 40 may optionally be a wave spring 42, 44 (as is shown in FIGS. 4, 11 and 13) or a Belleville 43 or disc spring (as is shown in FIG. 12), although the secondary spring 40 may be other kinds of springs as is known to one of ordinary skill in the art. In the alternative exemplary embodiment as depicted in FIG. 11, the wave spring 42 may be manufactured as part of the unitary seat 10 itself, thus the wave spring 42 is unitarily joined, integral, or is one-piece with the seat 10. In the alternative exemplary embodiments as depicted in FIG. 12 and FIG. 13, the disc spring 43 or wave spring 44, respectively, may be a separate or external component spring added to the unitary seat 10 during assembly. In certain exemplary embodiments, the secondary spring 40 may be omitted and the primary spring 30 can provide sufficient sealing of the seat surface 11 against the ball 50.

As depicted in FIGS. 1-4, the primary spring 30 has an angled, caret, trough, or "v" shaped partial cross section shape 71, wherein the vertex 71a is formed in or at the exterior 14 of the metal seat 10 and directed towards the body 61 of the valve 60 (as opposed to forming, directing, or pointing the vertex 71a towards the bore 62 of the valve body 61, or interior 13 of the metal seat 10). A whole cross section view of the spring 30 on one metal seat 10 contains two angle-out shapes 71, each with a vertex 71a defined on the metal seat exterior 14, as can be seen on FIG. 1. The shape 71 may also be referred to as a bellow or bellows shape 71. However, the shape, form, or structure of the primary spring 30 should not be limited to the angle-out cross section 71. Alternative exemplary embodiments of the primary spring 30 of the unitary metal seat 10 are depicted in the FIGS. 5-10, showing the shape, form, or structure of the primary spring 30 in partial cross section view, although other forms of the spring 30 are possible. While the figures may depict portions the metal seat 10 and/or spring 30 in partial cross section view, it is to be appreciated that a whole cross section view incorporates a mirror image of the respective partial cross section view for the metal seat 10, including the spring 30, base 20, and the seating segment 12, as the metal seat 10 is radially symmetric.

Figure 5:
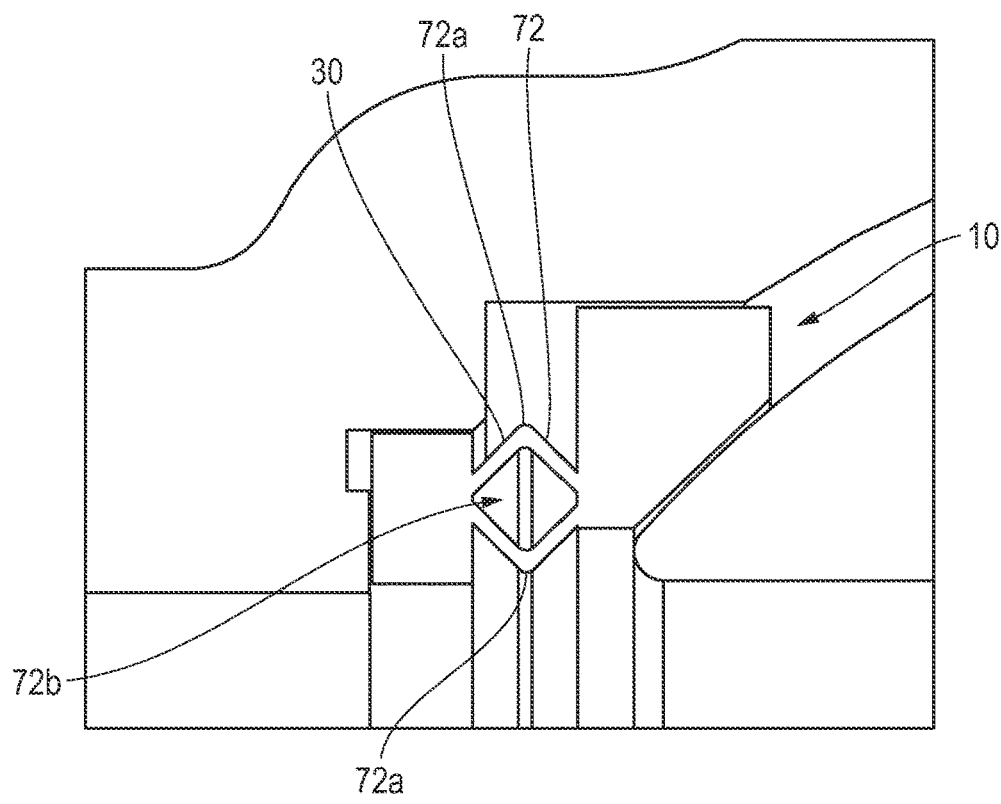
FIG. 5 depicts a partial cross sectional view of an alternative exemplary embodiment of a metal seat having a double angle shaped spring and a ball for a ball valve.
Figure 6:
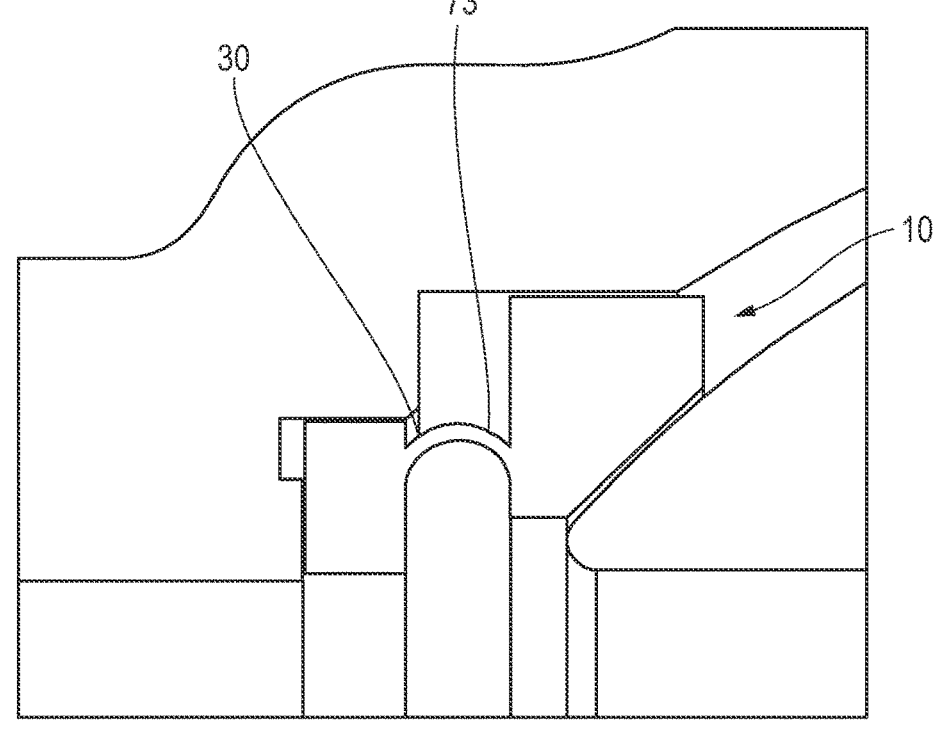
FIG. 6 depicts a partial cross sectional view of an alternative exemplary embodiment of a metal seat having a round-out shaped spring and a ball for a ball valve.
Figure 7:
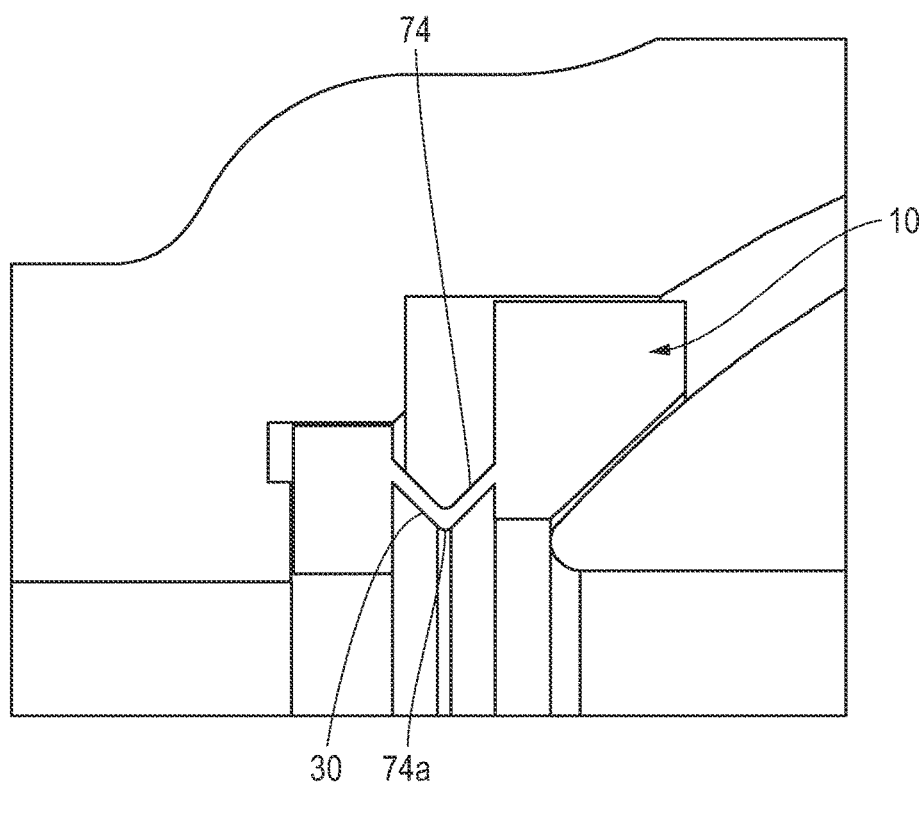
FIG. 7 depicts a partial cross sectional view of an alternative exemplary embodiment of a metal seat having an angle-in shaped spring and a ball for a ball valve.
Figure 8:
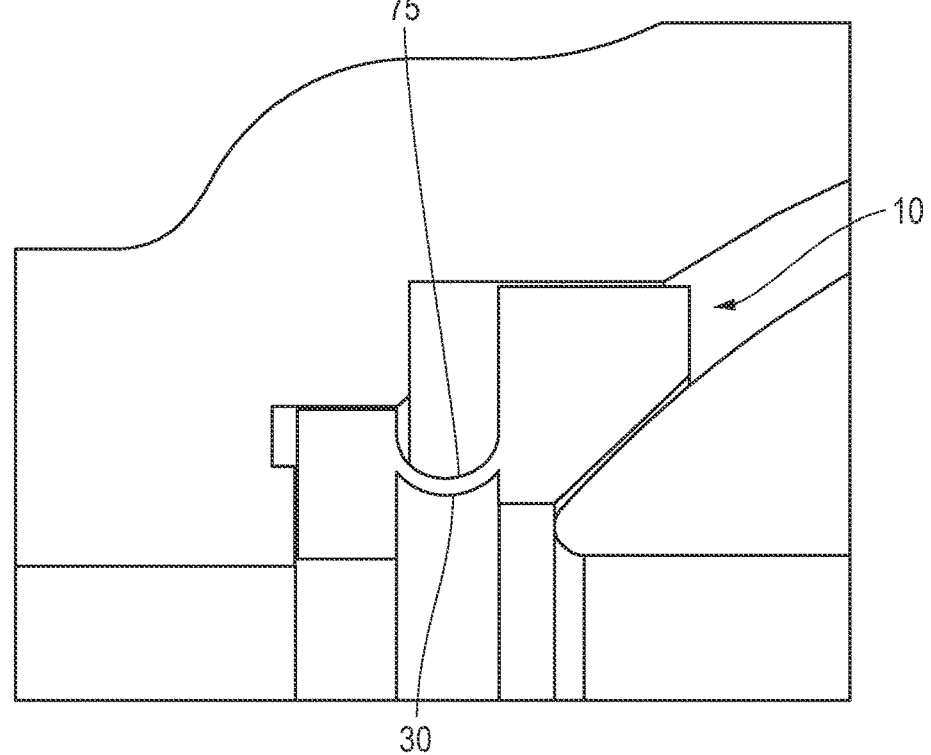
FIG. 8 depicts a partial cross sectional view of an alternative exemplary embodiment of a metal seat having a round-in shaped spring and a ball for a ball valve.
Figure 9:
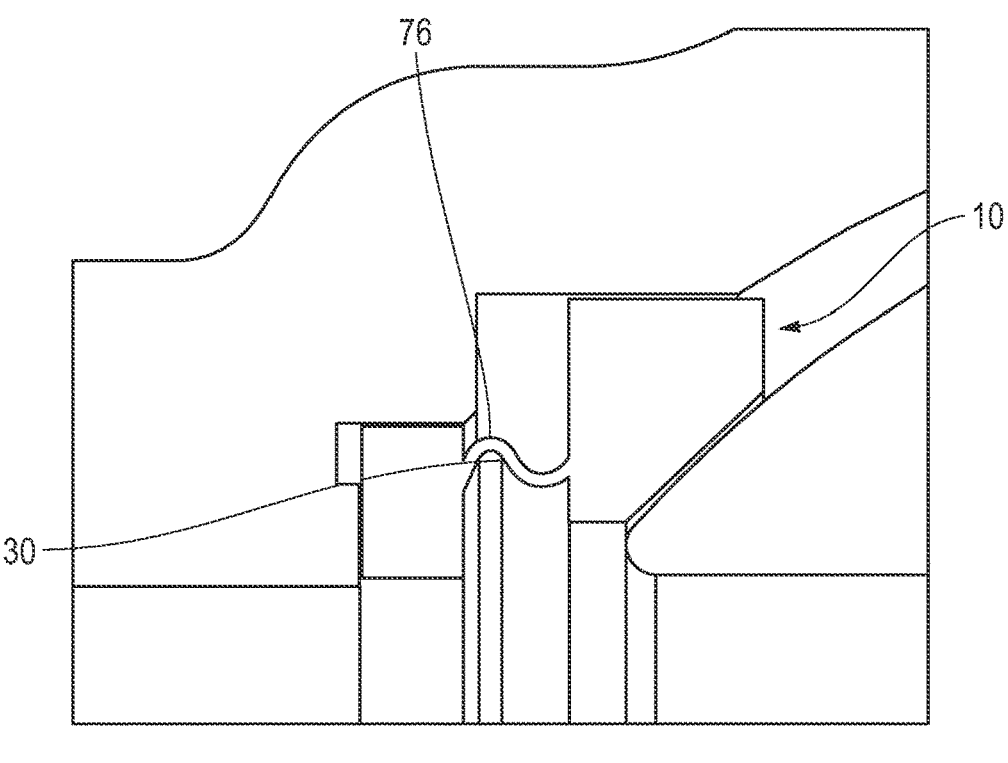
FIG. 9 depicts a partial cross sectional view of an alternative exemplary embodiment of a metal seat having a serpentine shaped spring and a ball for a ball valve.
Figure 10:
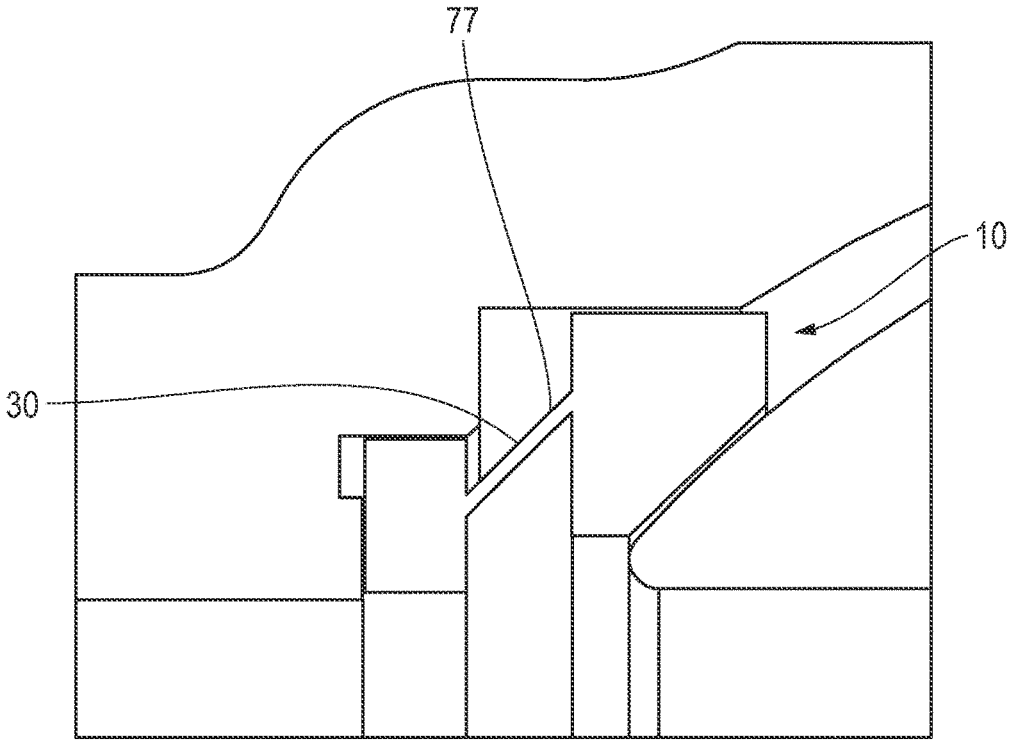
FIG. 10 depicts a partial cross sectional view of an alternative exemplary embodiment of a metal seat having a disc shaped or Belleville spring and a ball for a ball valve.

FIG. 5 depicts a double angle shape 72 in partial cross section of the spring 30. The double angle form 72 of the spring 30 in partial cross section shows a square or rectangular shape (or two joined carets), having a first vertex 72a formed in or pointed in the exterior surface 14 of the metal seat 10 and a second vertex 72a formed in or pointed in the interior surface 13 of the metal seat 10. The double angle shape or form 72 of the spring 30 may contain or define an enclosed area within the two vertices 72a. FIG. 6 depicts a round out shape or form 73 of the spring 30. The round-out form 73 in partial cross section depicts an arced or curved spring 30 which connects the base 20 and the seating segment 12. In the round-out form or shape 73, the convex side of the arc shape 73 is defined on the metal seat exterior surface 14, whereas the concave side of the arc shape 73 is defined on the metal seat interior surface 13. FIG. 7 depicts an angled, caret, trough or "v" shaped partial cross section shape 74, wherein the vertex 74a is directed towards, formed in, or pointed in the metal seat interior surface 13 or the bore 62 of the valve body 61. The spring partial cross section shape 74 in FIG. 7 may also be referred to as the angle-in shape 74. FIG. 8 depicts a round-in shape or form 75 of the spring 30. The round-in form 75 in partial cross section depicts an arced or curved spring 30 which connects the base 20 and the seating segment 12. In the round in form or shape 75, the convex side of the arc shape 75 defined in the interior surface 13 of the metal seat 10, whereas the concave side of the arc shape 75 defined on the exterior surface 14 of the metal seat 10. FIG. 9 depicts an "S" shaped, serpentine, wavelike, or undulating partial cross section shape 76 of the spring 30, wherein the spring 30 in partial cross section may have one or more curves adjacent to each other. FIG. 10 depicts a straight Belleville, or disc spring partial cross section shape 77 of the spring 30, wherein the spring 30 in partial cross section may be linear, as set at an angle (including perpendicular) between the base 20 and the seating segment 12.

The additive manufacturing process can produce a primary spring 30 of any custom shape or structure desired, so long as the primary spring 30 connects and is unitary with the base 20 and the seating segment 12 having the curved seating surface 11. Further, the unitary nature of the primary spring 30 prevents particulates, debris, and other detritus from entering and interfering with the metal seat 10 and the spring 30.

The base 20 is contiguous and adjacent to the primary spring 30, and further defines a back face 21 adjacent to the valve body 61 when installed. The back face 21 is wide enough to allow for a gasket seal 22 between the back face 21 and the valve body 61 without interfering in the metal seat's 10 ability to float.

The unitary metal seat 10, including the primary spring 30, base 20, and seating segment 12 with seating surface 11, may be produced in an exemplary embodiment via additive manufacturing (or three-dimensional printing), followed by machining to achieve mate-lapped surfaces. "Additive manufacturing" means processes used to make 3-dimensional articles. An example of an additive manufacturing technique is stereolithography (SLA) in which successive layers of material are laid down under computer control. The articles can be of almost any shape or geometry and are produced from a 3-dimensional model or other electronic data source. Other examples of additive manufacturing processes or techniques include 3d-printing. The additive manufacturing process allows the unitary metal seat 10 to be composed of multiple materials. By way of example only, the base 20 may be composed of a first material and the primary spring 30 may be composed of a second material while still being of a single, unitary piece. Further the metal seat 10 may be composed of a combination or mixture of metals and/or materials via additive manufacturing. In certain exemplary embodiments, the portions of the unitary metal seat 10 may all be composed of stainless steel material. The metal seat 10 can also be composed of one or more the following materials: nickel based alloys (e.g. INCONEL alloy), titanium, and others as known to one of ordinary skill in the art. In alternative exemplary embodiments, the unitary metal seat 10 may be produced by machining alone. The additive manufacturing process may include depositing, printing, or extruding layers of material upon, adjacent to, or on top of earlier deposited layers of material, wherein each of the layers of materials may be the same or different materials as desired to produce the form of a unitary, continuous, or single piece metal seat 10. During the process of depositing of the layers, a secondary spring 40 may be inserted at the appropriate location or layer, so as to be formed integral to the unitary metal seat 10 when a subsequent layer is deposited on top the secondary spring 40. Then one or more of the surfaces of the metal seat 10 may be machined to desired tolerances and/or finishes, including mate-lapping the curved seat surface 11. Other processes of manufacture capable of producing a unitary metal seat 10, as known to one of ordinary skill in the art, are encompassed within this disclosure.

The seating surface or seat interface 11 may be hard faced or overlayed with a harder material or coating than the material of the metal seat 10 to provide increased corrosion resistance, erosion resistance, and wear resistance when the seat surface 11 interacts with the ball 50. Any coating 16 on the seat surface 11 may be three-dimensionally printed onto the surface 11.

The unitary metal seat 10 may provide improved consistent torque or operational torque of the opening and closing of the valve assembly 60 over the prior art. The operational torque refers to involves the turning of the valve stem 63, which rotates the ball 50. The driving factors in this torque in operation are the seat 10 compressive stress, the packing stress, coefficient of friction between the seats 10 and the ball 50, coefficient of friction between the packing and the stem 63, and the media pressure and properties.

The unitary metal seat 10 minimizes the seat 10 stress to achieve the required sealing without excessively compressing the seats 10, which would increase the operational torque. On the other hand, conventional seat designs account for tolerance issues in components, generally causing increased seat stress. In yet other conventional seat designs with multiple separate components, there is an issue of tolerances and repeatability that the improved unitary metal seat 10 overcomes with its one-piece nature. Also, due to the nature of spring manufacture, the sole reliance on external springs for this force can lead to inconsistent forces, and by extension, torques. By way of further example, the unitary metal seat 10 can provide a Class VI shutoff or leakage rating per ANSI/FCI 70-2.

As a further improvement over conventional floating ball valve seats, the improved unitary seat 10 can maintain a seal (between the seat 10 and the ball 50) without the reliance of line pressure, or pressure from the valve media flow, due to the seat-to-ball contact stress created in assembly (unpressurized condition). In a conventional floating ball valve, the line pressure will float the ball into the seat to create a seal; in contrast, the unitary metal seat 10 may create a seal (between the curved seating surface 11 and ball outer surface 51) during assembly via precompression, without need for assistance from the line pressure or valve media to create said seal. This is in further addition, or an improvement, to the high pressure pressure-assisted sealing present in conventional metal seated ball valves.

Additionally, due to the consistent spring load from the primary spring 30 (and optionally the secondary spring 40, when present) on both sides of the ball 50, any valve 60 which utilizes the improved unitary seat 10 will have a more consistent wear pattern, and thus should have a longer service life compared to uni-directional valves. In conventional uni-directional valves, the upstream seat is typically the only seat that is spring loaded, which creates uneven wear. Also, due to the reduced stress, the valve 60 should last longer than other bi-directional valves as well.

While the embodiments are described with reference to various implementations and exploitations, it will be understood that these embodiments are illustrative and that the scope of the inventive subject matter is not limited to them. Many variations, modifications, additions, and improvements are possible.

Plural instances may be provided for components, operations or structures described herein as a single instance. These and other variations, modifications, additions, and improvements may fall within the scope of the inventive subject matter.

The invention claimed is:

1. A metal seat for a ball valve, comprising:
a seating segment of the metal seat;
a curved seating surface defined on the seating segment, wherein the curved seating surface is complementary to an outer surface of a ball of the ball valve;
a primary spring unitary with the seating segment and the curved seating surface;
a base unitary with the primary spring, the seating segment, and the curved seating surface;
a coating overlayed onto the curved seating surface, wherein a hardness of the coating is greater than a hardness of the seating segment;
wherein the primary spring is composed of a first material, the seating segment is composed of a second material, the coating is comprised of a third material and further wherein the first material, the second material and the third material are different;
wherein the primary spring defines an interstice, and further comprising a secondary spring inserted into the interstice;
wherein the primary spring forms a first caret shape in a cross sectional view of the primary spring; and
wherein the first caret defines a first vertex on an exterior surface of the primary spring.

2. The metal seat according to claim 1, wherein the primary spring forms a second caret shape in cross sectional view of the primary spring, and wherein the second caret is joined to the first caret and defines a second vertex on an interior surface of the primary spring.

3. The metal seat according to claim 1, wherein the seating segment, the primary spring, and the base are produced by a method of additive manufacturing.

4. The metal seat according to claim 1, further comprising a secondary spring inserted into the metal seat.

5. A valve having a valve body comprising:
a ball within the valve body, wherein the ball defines an outer surface;
a first metal seat inserted into the valve body upstream of the ball;
a second metal seat inserted into the valve body downstream of the ball;
wherein each of the first metal seat and the second metal seat comprise:
a curved seating surface defined respectively on each of the first metal seat and the second metal seat complementary to the outer surface of the ball;
a primary spring unitary with each of the curved seating surface;
a base unitary with each of the primary spring and each of the curved seating surface;
a coating overlayed onto each of the curved seating surfaces; and
wherein each of the primary springs are composed of a first material, each of the curved seating surfaces are composed of a second material, and each of the coatings are comprised of a third material and further wherein the first material, the second material and the third material are different;
wherein the first metal seat and the second metal seat each comprise a gasket seal inserted between a back face of the base and the valve body.

6. The valve of claim 5, wherein each of the primary spring of the first metal seat and the second metal seat define an upper interstice bounded by the valve body, and further comprising a secondary spring inserted into the upper interstice.

7. The valve of claim 5, wherein each of the primary springs of the first metal seat and the second metal seat define a lower interstice open to a bore of the valve body, and further comprising a secondary spring inserted into the lower interstice.

8. The valve of claim 5, wherein the curved seating surface, the primary spring, and the base of each of the first metal seat and the second metal seat are produced by a method of additive manufacturing.

9. The valve according to claim 5, wherein a cross sectional view of each of the first metal seat and the second metal seat has a first side, and a second side opposite to the first side, and wherein each of the primary springs consists of a single caret shape in the cross sectional view at each of the first side and at the second side.

10. The valve according to claim 9, further comprising a secondary spring inserted into each of the first metal seat and the second metal seat.

11. A method for use of a ball valve, comprising the following:
providing a ball within the ball valve, wherein the ball defines an outer surface;
providing a first metal seat upstream of the ball;
providing a second metal seat downstream of the ball;
wherein each of the first metal seat and the second metal seat comprise:
a curved seating surface defined on each of the first metal seat and the second metal seat complementary to the outer surface of the ball;

a primary spring unitary with each of the curved seating surface; and a base unitary with each of the primary spring and each of the curved seating surface;

a coating overlayed onto each of the curved seating surfaces, wherein the coating resists erosion and wear;

wherein each of the primary springs are composed of a first material, each of the curved seating surfaces are composed of a second material, and each of the coatings are comprised of a third material and further wherein the first material, the second material and the third material are different;

preventing a leak path behind each of the first metal seat and the second metal seat via a unitary connection of the curved seating surface, the primary spring, and the base of each of the first metal seat and the second metal seat; and wherein the step of preventing a leak path behind each of the first metal seat and the second metal seat is further via a bellows unitary with the primary spring and curved seating surface.

12. The method of claim 11 further comprising the steps of: additive manufacturing said first metal seat prior to said step of providing said first metal seat; and additive manufacturing said second metal seat prior to said step of providing said second metal seat.

13. The method of claim 11, further comprising the steps of torquing consistently; reducing torque; and providing a Class VI shutoff rating per ANSI/FCI 70-2.

14. The method according to claim 11, wherein a cross sectional view of each of the first metal seat and the second metal seat has a first side, and a second side opposite to the first side, and wherein each primary spring consists of a single caret shape in the cross sectional view at each of the first side and at the second side.

15. The method of claim 13, further comprising the step of maintaining a seal between the ball and each of the curved seating surfaces defined on each of the first metal seat and the second metal seat without reliance on a line pressure.

16. The method of claim 15, wherein the primary spring of the first metal seat and the second metal seat provides consistent spring loading on both sides of the ball; and further comprising the step of wearing the ball valve in a consistent wear pattern.

17. A method of manufacturing for a ball valve, comprising the steps of:

depositing one or more layers of material to produce a unitary seat having a seat base, a primary spring segment, and a seating segment; and mate-lapping a surface of the unitary seat;

wherein the step of depositing one or more layers of material comprises the steps of depositing a first set of layers of a first material via additive manufacturing, then depositing a second set of layers of a second material via additive manufacturing, and then depositing a third set of layers in a third material, wherein the first material, the second material and the third material each have a different composition of metals.

18. The method according to claim 17, wherein the third set of layers is a coating having a hardness greater than the material of the unitary seat and is deposited via additive manufacturing.

19. The method according to claim 18, wherein the surface of the unitary seat is defined on an interior surface of the seating segment and is arced to be complementary to a ball of the ball valve.

20. The method according to claim 19, further comprising the step of assembling the ball and the unitary seat in an unpressurized condition.

21. The method according to claim 18, wherein a cross sectional view of the unitary seat has a first side, and a second side opposite to the first side, and wherein each of the primary spring segments consists of a single caret shape in the cross sectional view at each of the first side and at the second side.

22. The method according to claim 21, further comprising the step of inserting a secondary spring into the unitary seat during the step of depositing one or more layers.

* * * * *